Dec. 29, 1970  W. S. OVERDIEP  3,551,545
METHOD FOR PROCESSING SYNTHETIC THERMOPLASTICS
INTO SHAPED STRUCTURES
Filed Jan. 8, 1968

INVENTOR
WIGLE S. OVERDIEP

BY *Francis W. Young*
ATTORNEY

United States Patent Office 3,551,545
Patented Dec. 29, 1970

3,551,545
METHOD FOR PROCESSING SYNTHETIC THERMOPLASTICS INTO SHAPED STRUCTURES
Wigle S. Overdiep, Dieren, Gilderland, Netherlands, assignor to American Enka Corporation, Enka, Buncombe, N.C., a corporation of Delaware
Filed Jan. 8, 1968, Ser. No. 696,331
Claims priority, application Netherlands, Jan. 27, 1967, 6701289
Int. Cl. B28b *3/20;* B29f *3/00*
U.S. Cl. 264—176
3 Claims

ABSTRACT OF THE DISCLOSURE

A method of producing a shaped structure from synthetic thermoplastics is disclosed. The method comprises transporting molten thermoplastic material under pressure through an extruder, forming the molten material into a shaped structure in a die connected to the extruder, periodically applying a tensile force to the shaped structure and then alternately drawing-off the shaped structure in a periodic manner from the die whereby a structure having a smooth surface is produced.

---

Figure 1:
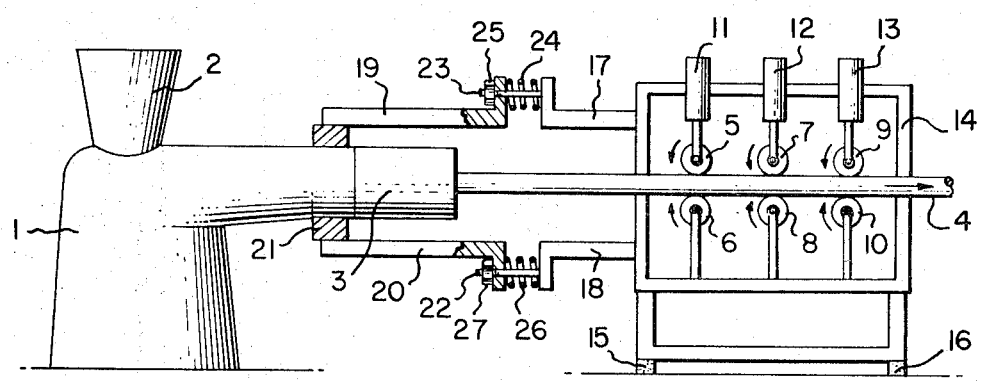

This invention relates to a profile-casting method and an apparatus or machine for the processing of synthetic thermoplastics into shaped structures with defined profiles. More particularly, the invention relates to a profile-casting machine having extruder means for transporting molten thermoplastic material under pressure, die means attached to the extruder means for forming the molten material into shaped structures with defined profiles, e.g., rods, beams, plates and the like, and a roller system or means for drawing off the shaped structures, the roller means and the die means cooperating to draw off each structure in a periodic manner.

A profile-casting machine is known having a drawing-off system similar to the roller system of the present invention. This apparatus is described in the copending application fo Hendrik J. Kalbfleisch, Ser. No. 644,010 filed June 6, 1967 now U.S. Pat. No. 3,449,749.

In the manufacture of rods from a wide variety of synthetic thermoplastics, more particularly from polyamides, the known machine does not present any difficulties. It has surprisingly been found, however, that in the manufacture of rods or other structures with defined profiles from other recently marketed synthetic materials, this known profile-casting machine presents some difficulties. This is particularly true in the case of the synthetic materials containing polyethylene terephthalate which are described, for instance, in the Netherlands applications Nos. 6511744; 6515106; and 6608999. This group of synthetic materials includes mixtures of polyethylene terephthalate with polypropylene, with poly-4-methylpentene, or with 0.001 to 0.5% by weight of an undissolved solid having an average particle size of 2 microns or less, if desired, in combination with a liquid that promotes crystallization of the polymer. More particularly, this group of synthetic materials include those mixtures in which the polyethylene terephthalate has a relative viscosity of at least 1.70 (measured on a 1% by weight solution in metacresol at 25° C.). However, it should be appreciated that similar difficulties are encountered in the casting of structures of a series of other synthetic materials, for instance, polyphenylene oxide, polyacetal, polycarbonate and the ABS polymers. These difficulties mainly consist in that the structure, e.g., a rod, when it issues from the die, has an irregular surface or even shows voids at its surface or in its interior. Of course, such rods can not be marketed as high-grade products.

In accordance with this invention, it has surprisingly been found that these enumerated difficulties can be obviated by modifying the existing profile-casting machines in a relatively simpler manner.

Thus, this invention contemplates a profile-casting apparatus for the processing of synthetic thermoplastics into shaped structures having defined profiles, comprising extruder means for transporting molten thermoplastic material under pressure, die means attached to the extruder means for forming the molten material into shaped structures, roller means for drawing-off the shaped structures, and means providing an indirect connection between the die means and the roller means, the indirect connection being provided with coupling means for periodically transmitting a tensile force which has a backlash, i.e., a play or movement, between two extreme coupling positions and which preferably has an elastic member or means that is tensioned or loaded when the coupling means periodically transmits a tensile force.

The present invention is based on an entirely new insight into the continuous manufacture of rods and other shaped structures having defined profiles. It has hitherto always been tried to have the rods formed in a die as uniformly and continuously as possible and also to have the rods issued from the die at a rate which is as nearly constant as possible. The present apparatus, however, is so constructed that there is a certain periodicity in the formation of the rods and the way in which they issue from the die. As a result, the melt of synthetic material can for some time solidify in the die from its wall inwards, while the melt is stationary. Not before a tube of solidified material of sufficient thickness has been formed, is the rod forwarded through the die. It has been found that this manner of forming the rod is a requisite for the manufacture of rods from the above-mentioned thermoplastic materials. When the melt solidifies against the wall of the die, the formed tube of solidified material is pressed against the wall of the die because of the pressure in the molten material within the tube. Moreover, the melt exerts a force along the axis of the rod in the same direction as the tensile force applied to the rod by the rollers of the roller system. By periodically varying, in accordance with a special program, the tensile force applied to the rod by the roller system it is possible to have the tube of solidified material stationary during its formation, and subsequently to forward it when the tube is sufficiently thick. In this way it is possible to forward the tube only when its wall is so thick that it does not break or crack under the influence of the forces applied thereto during its movement. Apparently this is a requisite for obtaining a smooth rod surface.

The moment when the formed tube of solidified material is displaced in the die, the frictional resistance between the tube and the die is removed almost entirely. Under special conditions it may even happen during this movement that some braking force must be applied to prevent the formation of voids in the rod.

The best results are obtained when, in accordance with the invention, the period of the drawing-off force corresponds to that in which a length of from 1 to 20 millimeters of the rod or the like structure is manufactured. It has been found that under these conditions the method can be controlled best, a high-quality product is obtained, and the profile-casting apparatus has its optimum production speed.

There are various possible constructions of the profile-casting machine by which the above-described variations in the drawing-off force could be realized. However, according to the invention a very simple construction is obtained when an elastic coupling means is provided between the extruder means, e.g., a screw extruder, and the frame of the roller system or means. It has been found that if use is made of this surprisingly simple construction, the drawing-off force is periodically varied by the apparatus itself. Although this phenomenon is not fully understood, it could be explained as follows: With the output of the screw extruder and the speed of the roller system properly set, the roller system will, during the period the forming rod is stationary, and against the reaction of the elastic coupling means move towards the screw extruder. As a result, the tensile force slowly increases. The moment the tensile force has reached its maximum value (which moment should coincide with the moment the formed tube of solidified material within the die is sufficiently thick) the formed rod slips through the die; the elastic coupling means returning the roller system to its initial position. Subsequently, this cycle is repeated.

According to this invention, there is a variant embodiment of the profile-casting machine, in which the coupling means is provided in the driving mechanism for the roller system. Under some conditions it may, when the rod is slipping through, be necessary to apply some braking force to it in order to prevent the rod from slipping through too far since in this case the melt would not rapidly fill up the evacuated space sufficiently. By preference, the profile-casing machine should be so constructed that such a braking force can be applied.

In addition, this invention is also concerned with a method for the manufacture of rods and the like shaped structures with defined profiles from thermoplastic materials.

In particular, this invention is also directed to a method of producing a shaped structure which comprises transporting molten thermoplastic material under pressure through an extruder, forming the molten material into a shaped structure in a die connected to the extruder, periodically applying a tensile force to the shaped structure and then alternately drawing-off the shaped structure in a periodic manner from the die whereby a structure having a smooth surface is produced.

The invention also relates to the rods manufactured by this method.

The profile-casting machine and method of this invention can be used with advantage particularly for the manufacture of rods measuring more than 30 millimeters in diameter from a synthetic material having a modulus of elasticity of at least 10,000 kg./cm.$^2$ at 20° C. It will be understood that the manufacture of this type of rod with the aid of the known apparatus represents serious difficulties.

Figure 2:
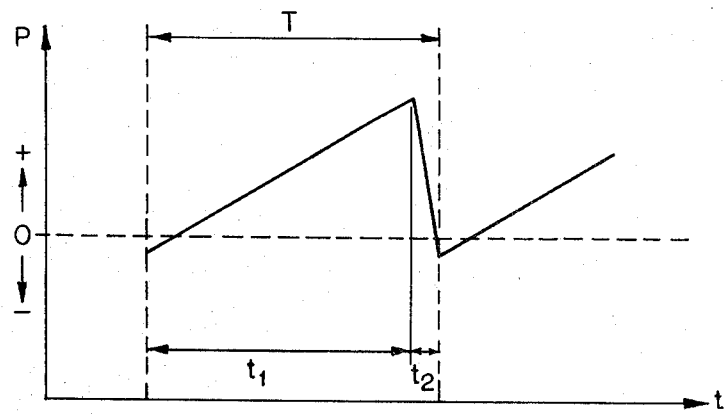

The method and apparatus of this invention will be further described with reference to the accompanying drawings, in which FIG. 1 schematically shows a profile-casting machine according to the invention partly in side elevation and partly in section; and FIG. 2 schematically shows the variation in the tensile force in the rods manufactured by the method of this invention.

In FIG. 1 the reference numeral 1 designates a screw extruder to which granules of a synthetic thermoplastic are fed via the feed hopper 2. These granules are melted in the screw extruder, and the resulting melt is supplied under pressure to a die 3.

It will be appreciated that an apparatus is also contemplated by the invention in which a melt of the synthetic thermoplastic is supplied to the screw extruder 1.

The barrel of the extruder whiich houses a rotating screw, is heated in known manner by heating means (which are not illustrated). The die 3 is cooled also in a conventional manner (the cooling means are not shown). As a result of this cooling, the melt can solidify from the inside wall of the die inwards. At the exit of the die the rod formed should largely be solidified so that a tensile force may be applied to it.

The tensile force is applied to the rod 4 by three roller pairs 5, 6; 7, 8; and 9, 10. These roller pairs form part of a roller system having a drawing-off frame 14 which is shown schematically and which is of the type described in more detail in the above-identified application of Hendrik J. Kalbfleisch. It will be appreciated therefore that one or more structures may be drawn off by such roller systems. With the above-described embodiment of the profile-casting machine, the drawing-off frame 14 is mounted at a distance of one meter from the exit of the die 3. It should be recognized, of course, that different types of drawing-off frames are also contemplated.

With the aid of three pneumatic (i.e., compressed air) cylinders 11, 12, and 13 the rollers 5, 7 and 9 respectively, are pressed toward the rollers 6, 8 and 10. Moreover, the rollers 5 to 10, inclusive, are rotated by a driving mechanism (not shown) in the directions indicated by the arrows. As a result, the rollers can, through friction, transmit a tensile force to the rod. The drawing-off frame 14 is mounted on the floor elastically, preferably by means of rubber blocks 15 and 16. Furthermore, the drawing-off frame is coupled elastically with the screw extruder 1.

The last-mentioned elastic coupling is provided, inter alia, by means including two rods 17 and 18, which are attached to the drawing-off frame, and two rods 19 and 20, which are, via a ring 21, attached to the barrel of the screw extruder 1. The rods 17 and 18 carry two axially directed bolts 23 and 22 respectively, which extend through openings in the bent ends of the rods 19 and 20. Two nuts 25 and 27 prevent the bolts 23 and 22 from being drawn from the openings.

As can be seen from FIG. 1, two compression springs 24 and 26 are provided around the bolts 22 and 23 in such an arrangement that the rods 17, 19 and 18, 20 can only move towards each other against the action of the springs. During operation of the apparatus, the rod which is being formed will periodically be stationary. As the rollers 5 to 10, inclusive, are rotated, the rollers will not only exert a tensile force on the rod 4, but also move to the left in the situation shown in FIG. 1. Consequently, the springs 24 and 26 are compressed, i.e., stressed or loaded, so that the tensile force exerted on the rod 4 will increase.

FIG. 2 schematically shows the variation in the axial force exerted on the rod 4. This variation in force is repeated after a period of time T and shows, within this period, two distinct phases. The increase in the tensile force P is indicated in the figure by the phase $t_1$. During this phase there is formed within the die 3 against its cooled inside wall a tube of solidified material, the thickness of which gradually increases. This tube, owing to the pressure of the molten material enclosed therein, is kept pressed against the inside wall of the die. As a result of being pressed against the inside wall, the frictional force between the tube and the die is so great that the tensile force P exerted on the bar 4 is balanced. The moment the tensile force P, owing to the gradual increase in the pressure of the springs 24 and 26, has reached a given maximum value, the tube of solidified material separates from the inside wall of the die, and the rod 4 slips to the right. The springs 24 and 26, as a result, expand to positions in which the nuts 25 and 27 form stops (phase $t_2$ is in FIG. 2).

Immediately after the rod has slipped through, the screw extruder supplies a fresh amount of the melt, which is pressed against the rod. If this happens before a frictional force has been built up between the rod and the inside wall of the die, a small force will be exerted on the rod. However, this force need not necessarily be produced in all cases. If this force is formed, the rollers 5 to 10, inclusive, may (for a very short period of time) serve the purpose of braking rollers. Practically immediately after this phase, freshly solidified melt attaches to the rod 4 and as a result a frictional force is built up again between the rod and the die. Very soon this frictional force can resist a tensile force in the rod, upon which the above-described cycle is repeated.

It will be clear that a cycle corresponding to that demonstrated in FIG. 2 can also be effected by using constructions of the profile-casting apparatus or machine different from the one shown in the drawings. For instance, it is possible to provide the driving mechanism for the rollers 5 to 10, inclusive, with a coupling which has a backlash, i.e., play or movement, between the coupling positions in which during operation the tensile force on the rod is at its maximum and is absent, respectively. This type of coupling should preferably have an elastic element which is tensioned (i.e., stressed or loaded) when the rollers 5 to 10, inclusive, exert a tensile force on the rod. Of course, the above effects can also be realized by using different constructions of the roller system.

It should be appreciated that an elastic coupling between the screw extruder and the drawing-off frame can also be formed by the rod 4 itself. However, the frame of the roller system should be mounted then a sufficiently great distance from the die, the distance increasing with the rod diameter and the modulus of elasticity of the material. Therefore, especially under these conditions, it is preferred to use a profile-casting apparatus in which the elastic coupling is incorporated in the apparatus itself.

Although in the apparatus shown in FIG. 1 the drawing-off frame and the screw extruder can move relative to each other between two extreme positions (which are defined by fixed stops), it is also contemplated that these stops can be made of elastic elements having a steep spring characteristic.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. A method of producing shaped structures from thermoplastic materials which comprises transporting molten thermoplastic material under pressure through an extruder to a die, solidifying the molten material to form a shaped structure within said die, and periodically applying a tensile force to the shaped structure wherein the said force applied is also periodically varied, the tensile force initially increasing to a maximum and then decreasing to a minimum, said shaped structure remaining stationary during the period of increasing tensile force and moving forward through the die during the period of decreasing tensile force whereby the resulting shaped structure has a smooth surface.

2. The method of claim 1 in which a thermoplastic material having a modulus of elasticity of at least 10,000 kg./cm.$^2$ is used to produce a rod measuring more than 30 mm. in diameter.

3. The method of claim 1 in which the force applied during drawing-off of said shaped structure is applied for a period of time corresponding to that in which a length of from 1 to 20 mm. of the shaped structure is produced.

References Cited

UNITED STATES PATENTS

| | | | |
|---|---|---|---|
| 1,088,171 | 2/1914 | Pehrson | 164—282(X) |
| 2,085,978 | 7/1937 | Hill et al. | 18—12(X) |
| 2,747,224 | 5/1956 | Koch et al. | 18—2(X) |
| 3,290,734 | 12/1966 | Wertli | 164—282 |
| 2,815,551 | 12/1957 | Hessenberg et al. | 164—83 |
| 3,039,142 | 6/1962 | Zavasnik | 18—12 |
| 3,387,330 | 6/1968 | Lemelson | 264—167(X) |
| 3,438,426 | 4/1969 | Parfit | 164—282 |

ROBERT F. WHITE, Primary Examiner

J. R. THURLOW, Assistant Examiner

U.S. Cl. X.R.

18—2, 12, 14; 114—282; 264—323, 331